(12) United States Patent
Rachal

(10) Patent No.: US 7,935,753 B2
(45) Date of Patent: May 3, 2011

(54) SURFACE TREATED PIGMENT

(75) Inventor: Thomas W. Rachal, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 434 days.

(21) Appl. No.: 11/598,309

(22) Filed: Nov. 13, 2006

(65) Prior Publication Data

US 2008/0114119 A1 May 15, 2008

(51) Int. Cl.
C08K 3/18 (2006.01)
C08F 214/06 (2006.01)

(52) U.S. Cl. ......................... 524/431; 524/567

(58) Field of Classification Search ................ 524/431, 524/567
See application file for complete search history.

(56) References Cited

U.S. PATENT DOCUMENTS

| | | | |
|---|---|---|---|
| 3,506,466 A | 4/1970 | Bramekamp et al. | |
| 3,728,142 A | 4/1973 | Rudolph et al. | |
| 3,754,956 A | 8/1973 | Durrant et al. | |
| 3,825,438 A | 7/1974 | Pritchard | |
| 3,956,222 A * | 5/1976 | Abe et al. | 524/567 |
| 4,224,080 A | 9/1980 | Chambers et al. | |
| 4,235,768 A | 11/1980 | Ritter et al. | |
| 4,375,520 A | 3/1983 | Pennie et al. | |
| 4,375,989 A | 3/1983 | Mäkinen | |
| 4,563,221 A | 1/1986 | Humphreys | |
| 4,599,114 A | 7/1986 | Atkinson | |
| 4,762,523 A | 8/1988 | Gawol et al. | |
| 4,863,800 A | 9/1989 | Miyoshi et al. | |
| 4,909,853 A | 3/1990 | Wienkenhöver et al. | |
| 4,935,063 A | 6/1990 | Costanzi et al. | |
| 4,986,853 A | 1/1991 | Kieser | |
| 5,228,912 A | 7/1993 | Herget et al. | |
| 5,260,353 A | 11/1993 | Palmer et al. | |
| 5,288,320 A | 2/1994 | Decelles | |
| 5,362,770 A | 11/1994 | Palmer et al. | |
| 5,443,915 A * | 8/1995 | Wilkie et al. | 428/461 |
| 5,476,643 A | 12/1995 | Fogel | |
| 5,567,754 A | 10/1996 | Stramel | |
| 5,643,592 A | 7/1997 | Jacobson et al. | |
| 5,733,365 A | 3/1998 | Halko et al. | |
| 5,830,929 A | 11/1998 | Stramel | |
| 5,908,498 A | 6/1999 | Kauffman | |
| 5,910,213 A | 6/1999 | Ashdown et al. | |
| 6,517,629 B2 | 2/2003 | Kinniard | |
| 6,544,328 B2 | 4/2003 | Roberts et al. | |
| 6,547,870 B1 | 4/2003 | Griessmann et al. | |
| 7,011,703 B1 | 3/2006 | Craig | |
| 2001/0056152 A1* | 12/2001 | Okuhara et al. | 524/497 |
| 2003/0029359 A1 | 2/2003 | Marshall et al. | |
| 2006/0000390 A1 | 1/2006 | Bolt et al. | |
| 2006/0019028 A1 | 1/2006 | Yeung et al. | |
| 2006/0032402 A1 | 2/2006 | Drews-Nicolai et al. | |
| 2006/0034739 A1 | 2/2006 | Drews-Nicolai et al. | |
| 2006/0042510 A1 | 3/2006 | Craig | |
| 2006/0042511 A1* | 3/2006 | Craig | 106/447 |
| 2006/0042512 A1 | 3/2006 | Craig | |
| 2006/0263713 A1* | 11/2006 | Foster et al. | 430/199 |

OTHER PUBLICATIONS

Hawley, Gessner Goodrich and Lewis Richard J., Sr., *Hawley's Condensed Chemical Dictionary*, 14th Ed., 2001, p. 1126, John Wiley & Sons, Inc., New York, NY (definition of triethylene glycol di(2-ethylhexoate)).
Wickson, Edward J., *Handbook of Polyvinyl Chloride Formulating*, Wickson Product Research, Ltd., Baton Rouge, Louisiana, Copyright 1993, pp. 457, 463-465, John Wiley & Sons, Inc., New York, NY.
International Preliminary Report on Patentability and Written Opinion in PCT/US2007/022255, mailed May 19, 2009, Tronox LLC.
Communication pursuant to Article 94(3) EPC in EP Application No. 07839675.1, mailed Sep. 9, 2009, Tronox LLC.

* cited by examiner

*Primary Examiner* — Ling-Siu Choi
*Assistant Examiner* — Hui Chin
(74) *Attorney, Agent, or Firm* — McAfee & Taft

(57) ABSTRACT

Surface treated inorganic oxide pigments are provided wherein one or more of the ethylene glycol esters and diesters are applied to the surface of a base inorganic oxide pigment, for example, an anatase titanium dioxide pigment from the calciner of a conventional sulfate route process for making titanium dioxide pigments or especially a rutile titanium dioxide pigment from the oxidizer in a conventional chloride route process for making titanium dioxide pigments.

37 Claims, 2 Drawing Sheets

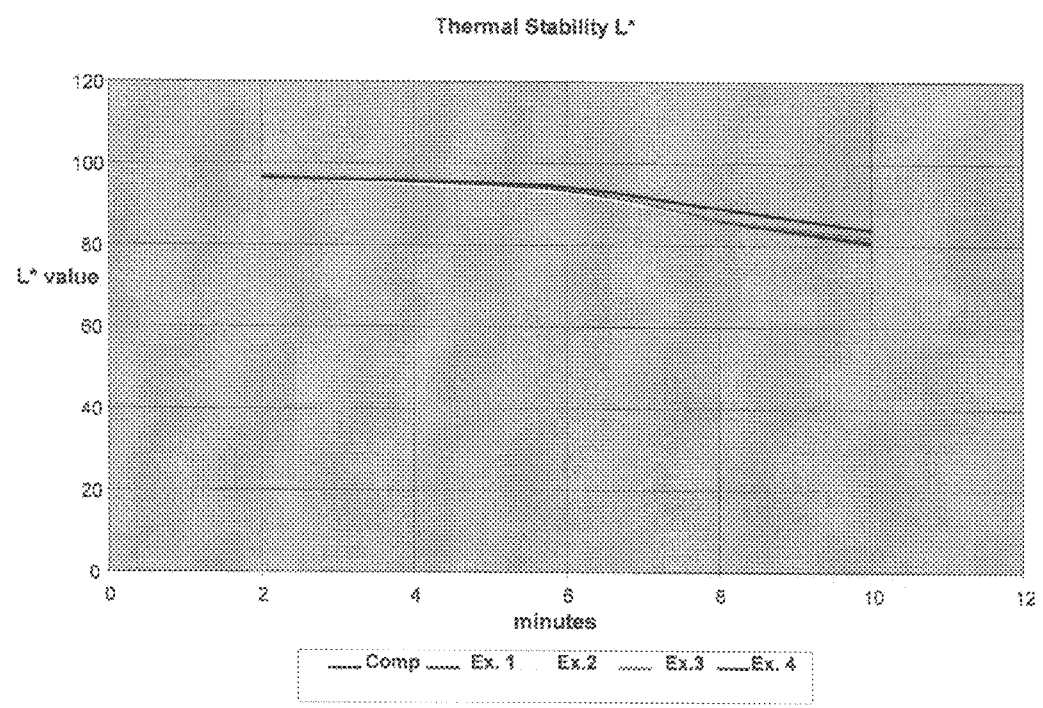
Figure 1 – Thermal Stability L*

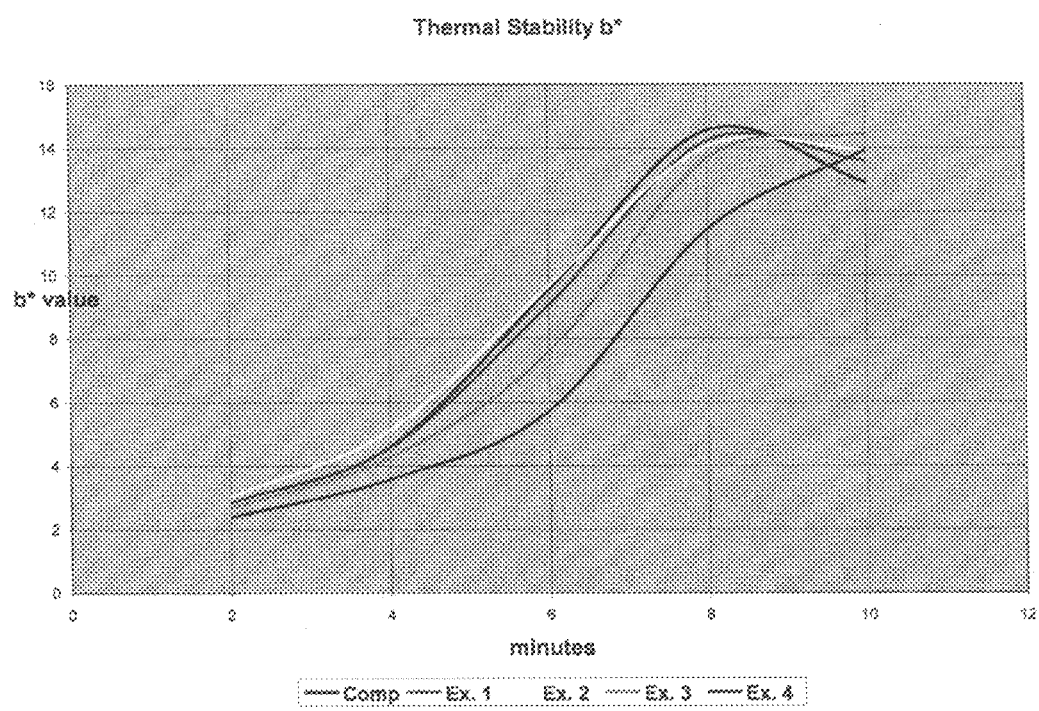
Figure 2 – Thermal Stability b*

SURFACE TREATED PIGMENT

FIELD OF THE INVENTION

This invention generally relates to improved surface treatments for inorganic pigments, especially titanium dioxide.

BACKGROUND OF THE INVENTION

Titanium dioxide is very widely used as an opacifier and colorant in very many applications, including in paper and paper products, in paints, coatings and coated goods, and in thermoplastics, thermosets and the articles made therefrom. A variety of inorganic and organic surface treatments have been developed over the years to provide certain desired attributes to base titanium dioxide pigments whether made by the older sulfate process or the more recent chloride process.

In thermoplastic applications in particular, processors desire pigments which disperse quickly and cleanly in their mixing systems, offer good tinting and opacifying properties, and provide extended run times with a minimal amount of residue. Further, since the manufacture of thermoplastic compositions and of finished thermoplastic goods involves exposing the included pigments to elevated temperatures for often substantial periods of time, it is especially desired that the pigments available for such applications have not only the aforementioned properties but also have excellent thermal stability.

SUMMARY OF THE PRESENT INVENTION

Such highly desirable pigments are provided in the form of the surface treated inorganic oxide pigments of the present invention, in which a base inorganic oxide pigment—preferably being a base titanium dioxide pigment produced by either a sulfate or chloride process, but more preferably being a rutile pigment produced by a chloride process—is surface treated with one or more of the ethylene glycol esters and diesters.

BRIEF DESCRIPTION OF THE DRAWINGS

FIGS. 1 and 2 graphically illustrate the dynamic thermal stability of the surface treated inorganic oxide pigments of the present invention in PVC, as further described in the Examples below.

DETAILED DESCRIPTION OF PREFERRED EMBODIMENTS

The present invention is concerned with surface treated inorganic oxide pigments generally, wherein one or more of the ethylene glycol esters and diesters are applied to the surface of a base inorganic oxide pigment, for example, an anatase titanium dioxide pigment from the calciner of a conventional sulfate route process for making titanium dioxide pigments or especially a rutile titanium dioxide pigment from the oxidizer in a conventional chloride route process for making titanium dioxide pigments. The surface treated inorganic oxide pigments contemplated by the present invention may be used in any application wherein such materials are conventionally used, of course, for example in paper and paper products, in paints, coatings and coated goods, and in thermoplastics, thermosets and the articles made therefrom. A preferred application will be in thermoplastic or thermoset compositions and in the articles respectively made from such compositions, while a more preferred application will be in the thermoplastic compositions and articles.

An especially preferred application will be in polyvinyl chloride (PVC), in chlorinated polyvinyl chloride (CPVC) or in polyethylene compositions and the articles respectively made from pigmented homopolymers or copolymers of PVC, CPVC or polyethylene, for example. In this most preferred context, the ethylene glycol esters and diesters have been known and used previously as plasticizers and as processing aids, but to our knowledge it has not been appreciated that the ethylene glycol esters and diesters could be applied as a surface treatment to a titanium dioxide pigment and the surface-treated pigment incorporated into a polyethylene, PVC or CPVC material with good dispersibility, good tinting and opacifying properties, with little residue on extrusion and excellent thermal stability.

Preferred ethylene glycol esters and diesters contain ethylene glycol moieties and have the general formula ROC$(OCH_2CH_2)_n$OCOR, where n in a real number from two to about fourteen and R is a straight-chain or branched-chain alkyl group containing at least two up to about fifteen carbon atoms. These materials are preferably incorporated on the pigment in a total amount ranging from 0.01 to about 1 weight percent based on the pigment, and may be combined with other suitable inorganic oxide and organic surface treatments. For example, trimethylolpropane (commonly, TMP) may be deposited on the surface of the pigment in an comparable amount, ranging in preferred embodiments up to about 1 percent by weight based on the pigment. Where inorganic oxide treatments are performed, these will preferably be done prior to any treatment with the ethylene glycol esters and diesters of the present invention and any other organic surface treatment such as TMP.

More preferred surface treatment materials according to the present invention include: triethylene glycol di-2-ethylhexoate, presently commercially available from The C.P. Hall Company, Chicago, Ill. as TegMeR® 803 glycol ester (CAS No. 94-28-0); tetraethylene glycol di-2-ethylhexoate, presently commercially available from The C.P. Hall Company, Chicago, Ill. as TegMeR® 804 glycol ester (CAS No. 18268-70-7); and polyethylene glycol di-2-ethylhexoate, presently commercially available from The C.P. Hall Company, Chicago, Ill. as TegMeR® 809 glycol ester (CAS No. 9004-93-7).

The ethylene glycol esters and diesters of the present invention may be applied in any manner suited to applying such materials to a titanium dioxide pigment, for example, by deposition in a fluid energy mill in which the pigment is ground to a desired size prior to packaging or being formed into a final product slurry, applying the esters or diesters to the dry pigment by mixing or spraying, or through the drying of pigment slurries containing the ester or diester materials.

The present invention is further illustrated by the following examples:

Examples 1-4 with Comparative Example

Four samples of the same commercial scale, rutile titanium dioxide base were treated in a fluid energy mill to deposit 0.3 percent by weight, based on the pigment, of the conventional organic treatment trimethylolpropane (TMP), along with two different amounts each of the TegMeR® 803 glycol ester and TegMeR® 804 glycol ester materials, respectively. A fifth sample was treated as a control for purposes of comparison, depositing only 0.3 percent of TMP. Each of the pigment samples thus prepared was tested for various attributes as described in greater detail hereafter, including dry color (Dry L*) and brightness (Dry b*), LDPE tint strength (TS) and tint tone (TT), LDPE high load equilibrium torque, LDPE screen pack (PPM), PVC fusion torque (FT) and dynamic thermal stability. The particular details for testing each of these attributes are as follows, with the results of the testing being reported in Table 1 below, or reflected in FIGS. 1 and 2 for the dynamic thermal stability tests:

Dry Color and Brightness Tests: These were performed by forming the dry treated pigment (each of the four inventive samples and the control) into a pellet over 30 seconds at 3000 psi using a formed stainless steel die, and then using a Hunter Lab model Ultrascan XE spectrophotometer (Hunter Associates Laboratory, Inc., Reston, Va.), to measure the color and brightness of the pelletized TiO2 samples.

LDPE Tint Strength and Tint Tone: For these tests the pigment samples were blended into a carbon black low density polyethylene plastic concentrate, manufactured by Chroma Corporation, which contains Raven 1020 at 0.011% by weight, Dow MN711 LDPE at 20.00% by weight, and Dow 640 LDPE at 79.98% by weight. This black color concentrate is collectively known in the industry as Color No. CP83513. The test samples were prepared by mixing 2.50 grams of a pigment with 55.0 grams of the black color concentrate and 0.27 grams of U.S.P. Grade A zinc stearate powder over the course of six minutes at 100 rpm, in a Brabender mixer fitted with CAM blades and at a temperature of 100 degrees Celsius. When the temperature of the Brabender mixer had equilibrated at 100° C., the pigment-containing test sample was poured into the loading chute of the mixer. A 5 kilogram ram was then put into place in the loading chute according to the manufacturer's directions and the mixer was turned on. Once the batch had fused (approximately two minutes) the loading chute and ram assembly were removed and a weighted containment arm was put into place for the duration of the mixing. The resulting blended plastic mass was then compression molded into a plaque according to ASTM D5224, and the tint strength and tint tone values determined by comparing the CIE L* and b* values on a MacBeth model 7000A spectrophotometer using a D65 illuminant, 10° observer angle, and specular reflectance included.

LDPE High Load Equilibrium Torque: The inventive and control pigment samples (at 75 parts per hundred by weight) were each blended with 4012 grade low density polyethylene from The Dow Chemical Company, Midland, Mich. (at 25 parts per hundred by weight), at 100 degrees Celsius and a mixing speed of 100 rpm, using CAM blades in a Brabender mixer, to yield a 75% TiO2 masterbatch concentrate in LDPE. The torque profile associated with the formation of the masterbatch concentrate was determined for each sample, to establish for each the high load equilibrium torque reported in Table 1 below.

Screen Pack: The screen pack value and extruder backpressure (in PSI) were determined using three screens—two 40 mesh stainless steel screens with a 500 mesh stainless steel screen between—in conjunction with a torque rheometer (in this case, a Brabender PL-2000 Plasti-corder) which has been equipped with a single screw extruder attachment and horizontal rod die, to determine the amount of residue left on the screen pack assembly and thus how well the TiO2 samples were dispersed in the masterbatch.

More particularly, for the screen pack value in accordance with ASTM D6265, each of the two 40 mesh (US), 1.125 inch diameter screens and the 500 mesh (US), 1.125 inch diameter screen were pre-dried in a muffle furnace at 700° C. for ten minutes. Upon removal from the muffle furnace, the screens were placed in a desiccator until they reached ambient temperature (23° C.) and the 500 mesh screen was then weighed (the "before" weight).

The screen pack was then placed between the single screw extruder and the die. The screen pack consisted of a spacer ring next to the nose of the screw, one of the 40 mesh screens, followed by the 500 mesh screen, followed by the remaining 40 mesh screen and finally a breaker plate.

A 500 ppm mixture of Irganox B-900 antioxidant (manufactured by Ciba Specialty Chemicals, Basel, Switzerland) in low density polyethylene was made by blending 1000.0 grams of Dow 4012 LDPE resin (The Dow Chemical Company, Midland, Mich.) and 0.05 grams of Irganox B-900. The samples tested each consisted of 36.8 grams of the Irganox B-900/Dow 4012 blend and 110.5 grams of a pigment sample which were thoroughly blended. The samples were fused in a Brabender mixer, then cooled and granulated. The screw speed on the extruder was set to 75 rpm.

One hundred grams of each granulated sample were added to the extruder feed hopper and allowed to completely extrude through the screen pack and die. The extruder was then purged with 200 grams of virgin Dow 4012 LDPE resin. When the extruder was completely emptied the screen pack assembly was removed from the extruder attachment and placed in a 700° C. muffle furnace for ten minutes. The screens were allowed to cool in a desiccator and the 500 mesh screen was weighed. This weight was the "after" weight. The screen pack residue, in parts per million, is calculated as follows:

(["after" weight–"before" weight]/75 g TiO2)×1,000,000

PVC Fusion Torque: To examine the effect of the ethylene glycol diester surface treatments on the processability of the base titanium dioxide pigment, the samples described above were combined with polyvinyl chloride in a blender using rollerblades at 60 rpm and at 180 degrees Celsius, and the fusion torque and time of the samples determined according to ASTM D2538, together with the gelation time (in milligrams/minute).

PVC Dynamic Thermal Stability: Pigmented PVC compositions were prepared in the same blender (as the PVC Fusion Torque tests) but at 100 rpm and 205 degrees Celsius. Representative samples were pulled from the Brabender mixer every two minutes until the PVC matrix degraded. The L* and b* values were read on the pulled samples, and the results are shown as a function of processing time in FIGS. 1 and 2.

Results of the various other tests (other than dynamic thermal stability) are found in Table 1 as follows:

TABLE 1

ATTRIBUTES OF INVENTIVE SURFACE-TREATED TiO2

| Example | Surface Treatments | TS | TT | Dry L* | Dry b* | Torque | PSI | PPM | Fusion Time (seconds) | Gel Time (mg/m) |
|---|---|---|---|---|---|---|---|---|---|---|
| Comp | 0.3% TMP | 102.4 | −5.4 | 98.0 | 1.48 | 1496 | 858 | 143 | 0:30 | 3827 |
| 1 | 0.3% TMP, 0.3% 803 | 104.3 | −5.5 | 97.7 | 1.22 | 1493 | 859 | 95 | 0:30 | 3502 |
| 2 | 0.3% TMP, 0.6% 803 | 100.9 | −5.6 | 97.8 | 1.34 | 1482 | 744 | 47 | 0:38 | 3666 |

TABLE 1-continued

ATTRIBUTES OF INVENTIVE SURFACE-TREATED TiO2

| Example | Surface Treatments | TS | TT | Dry L* | Dry b* | Torque | PSI | PPM | Fusion Time (seconds) | Gel Time (mg/m) |
|---------|-------------------|-----|------|--------|--------|--------|-----|-----|----------------------|-----------------|
| 3 | 0.3% TMP, 0.3% 804 | 99.3 | −5.5 | 97.7 | 1.23 | 1547 | 770 | 73 | 0:34 | 2446 |
| 4 | 0.3% TMP, 0.6% 804 | 102.1 | −5.5 | 97.2 | 0.93 | 1531 | 760 | 77 | 0:34 | 3165 |

As will be apparent from an examination of the tabulated values above and from FIGS. 1 and 2, the inventive surface treated pigments indeed provide both good processing and optical performance in LDPE and in PVC.

Those skilled in the art may readily conceive of still other alterations to, variations of and equivalents to the specific embodiments of the invention described herein but which should properly be considered as within the scope of our inventive contributions. Accordingly, the scope of the present invention should be assessed as that of the appended claims and by equivalents thereto.

What is claimed is:

1. A surface treated inorganic oxide pigment, comprising:
   a. a base inorganic oxide pigment; and
   b. an organic surface treatment material deposited on the surface of said base inorganic oxide pigment, said organic surface treatment material being selected from ethylene glycol esters, ethylene glycol diesters and mixtures thereof, wherein said ethylene glycol esters and ethylene glycol diesters have the general formula ROC(OCH$_2$CH$_2$)$_n$OCOR, where n is a real number from two to about fourteen and R is a straight-chain or branched-chain alkyl group containing at least two up to about fifteen carbon atoms.

2. The surface treated inorganic oxide pigment as defined in claim 1, wherein said organic surface treatment material is deposited on the surface of said base inorganic pigment in an amount in the range of from about 0.01 to about 1 weight percent, based on the pigment.

3. The surface treated inorganic oxide pigment as defined in claim 2, wherein said organic surface treatment material is selected from triethylene glycol di-2-ethylhexoate, tetraethylene glycol di-2-ethylhexoate, polyethylene glycol di-2-ethylhexoate and mixtures thereof.

4. The surface treated inorganic oxide pigment as defined in claim 1, wherein said base inorganic oxide pigment is titanium dioxide pigment.

5. The surface treated inorganic oxide pigment as defined in claim 4, wherein a masterbatch composition comprising 10 or more percent by weight of a surface treated titanium dioxide pigment and 10 percent or more by weight of an olefinic homopolymer or copolymer.

6. The surface treated inorganic oxide pigment as defined in claim 4, wherein a chlorinated polyvinyl chloride composition comprising polyvinyl chloride or chlorinated polyvinyl chloride and 0.1 or more parts by weight of a surface treated titanium dioxide pigment per one hundred parts by weight of the polyvinyl chloride or chlorinated polyvinyl chloride.

7. The surface treated inorganic oxide pigment as defined in claim 1, wherein a masterbatch composition comprising 10 or more percent by weight of a surface treated inorganic oxide pigment and 10 percent or more by weight of an olefinic homopolymer or copolymer.

8. The surface treated inorganic oxide pigment as defined in claim 1, wherein a chlorinated polyvinyl chloride composition comprising polyvinyl chloride or chlorinated polyvinyl chloride and 0.1 or more parts by weight of a surface treated inorganic oxide pigment per one hundred parts by weight of the polyvinyl chloride or chlorinated polyvinyl chloride.

9. A surface treated titanium dioxide pigment, comprising:
   a. a base titanium dioxide pigment; and
   b. an organic surface treatment material deposited on the surface of said base titanium dioxide pigment, said surface treatment material being selected from ethylene glycol esters, ethylene glycol diesters and mixtures thereof, wherein said ethylene glycol esters and ethylene glycol diesters have the general formula ROC(OCH$_2$CH$_2$)$_n$OCOR, where n is a real number from two to about fourteen and R is a straight-chain or branched-chain alkyl group containing at least two up to about fifteen carbon atoms.

10. The surface treated titanium dioxide pigment of claim 9, wherein said base titanium dioxide pigment is a rutile titanium dioxide pigment produced by the chloride process.

11. The surface treated titanium dioxide pigment of claim 9, further comprising an additional organic treatment material deposited on the surface of said base titanium dioxide pigment.

12. The surface treated titanium dioxide pigment of claim 11, wherein said additional organic treatment material is trimethylolpropane.

13. The surface treated titanium dioxide pigment as defined in claim 9, wherein said organic surface treatment material is deposited on the surface of said base inorganic pigment in an amount in the range of from about 0.01 to about 1 weight percent, based on the pigment.

14. The surface treated titanium dioxide pigment as defined in claim 9, wherein said organic surface treatment material is selected from triethylene glycol di-2-ethylhexoate, tetraethylene glycol di-2-ethylhexoate, polyethylene glycol di-2-ethylhexoate and mixtures thereof.

15. A polymer composition, comprising:
   a. a base polymer material; and
   b. a surface treated inorganic oxide pigment, said surface treated inorganic oxide pigment including:
      i. a base inorganic oxide pigment;
      ii. an organic surface treatment material deposited on the surface of said base inorganic oxide pigment, said organic surface treatment material being selected from ethylene glycol esters, ethylene glycol diesters and mixtures thereof, wherein said ethylene glycol esters and ethylene glycol diesters have the general formula ROC(OCH$_2$CH$_2$)$_n$OCOR, where n is a real number from two to about fourteen and R is a straight-chain or branched-chain alkyl group containing at least two up to about fifteen carbon atoms.

16. The polymer composition of claim 15 wherein said base polymer material is a thermoplastic polymer.

17. The polymer composition of claim 16 wherein said thermoplastic polymer is selected from polyvinyl chloride, chlorinated polyvinyl chloride and polyethylene.

18. The polymer composition of claim 16 wherein said thermoplastic polymer is selected from polyvinyl chloride and chlorinated polyvinyl chloride.

19. The polymer composition of claim 16 wherein said thermoplastic polymer is polyvinyl chloride.

20. The polymer composition of claim 15, wherein said base inorganic oxide pigment of said surface treated inorganic oxide pigment is a titanium dioxide pigment.

21. The polymer composition of claim 20, wherein said base titanium dioxide pigment is a rutile titanium dioxide pigment produced by the chloride process.

22. The polymer composition of claim 20, wherein said surface treated inorganic oxide pigment further comprises an additional organic treatment material deposited on the surface of said base inorganic oxide pigment.

23. The polymer composition of claim 22, wherein said additional organic treatment material is trimethylolpropane.

24. The polymer composition of claim 15, wherein said organic surface treatment material of said surface treated inorganic oxide pigment is deposited on the surface of said base inorganic pigment in an amount in the range of from about 0.01 to about 1 weight percent, based on the pigment.

25. The polymer composition of claim 15, wherein said organic surface treatment material of said surface treated inorganic oxide pigment is selected from triethylene glycol di-2-ethylhexoate, tetraethylene glycol di-2-ethylhexoate, polyethylene glycol di-2-ethylhexoate and mixtures thereof.

26. The polymer composition of claim 15, wherein said organic surface treatment material of said surface treated inorganic oxide pigment is selected from triethylene glycol di-2-ethylhexoate and tetraethylene glycol di-2-ethylhexoate.

27. A method of treating the surface of a base titanium dioxide pigment to enhance the processing and optical properties of the pigment when the pigment is admixed with a polymer composition, comprising:
  a. applying an organic surface treatment material to the surface of said base titanium dioxide oxide pigment, said organic surface treatment material being selected from ethylene glycol esters, ethylene glycol diesters and mixtures thereof, wherein said ethylene glycol esters and ethylene glycol diesters have the general formula $ROC(OCH_2CH_2)_nOCOR$, where n is a real number from two to about fourteen and R is a straight-chain or branched-chain alkyl group containing at least two up to about fifteen carbon atoms.

28. The method of claim 27 wherein said organic surface treatment material is applied to the surface of said base titanium dioxide pigment by depositing said material on the surface of the pigment in a fluid energy mill.

29. The method of claim 27 wherein said base titanium dioxide pigment is a rutile titanium dioxide pigment produced by the chloride process.

30. The method of claim 27 wherein said method further comprises the step of applying an additional organic surface treatment material to the surface of said base titanium dioxide pigment.

31. The method of claim 30 wherein said additional organic treatment material is trimethylolpropane.

32. The method of claim 27, wherein said organic surface treatment material is deposited on the surface of said base inorganic pigment in an amount in the range of from about 0.01 to about 1 weight percent, based on the pigment.

33. The method of claim 27, wherein organic surface treatment material is selected from triethylene glycol di-2-ethylhexoate, tetraethylene glycol di-2-ethylhexoate, polyethylene glycol di-2-ethylhexoate and mixtures thereof.

34. The method of claim 27, wherein organic surface treatment material is selected from triethylene glycol di-2-ethylhexoate and tetraethylene glycol di-2-ethylhexoate.

35. A surface treated inorganic oxide pigment, comprising:
  a base inorganic oxide pigment; and
  an organic surface treatment material deposited on the surface of said base inorganic oxide pigment, said organic surface treatment material being selected from ethylene glycol esters, ethylene glycol diesters and mixtures thereof;
  wherein said ethylene glycol esters and ethylene glycol diesters have the general formula $ROC(OCH_2CH_2)_nOCOR$, where n is a real number from two to about fourteen and R is a straight-chain or branched-chain alkyl group containing at least two up to about fifteen carbon atoms;
  wherein said organic surface treatment material is deposited on the surface of said base inorganic pigment in an amount in the range of from about 0.01 to about 1 weight percent, based on the pigment; and
  wherein said organic surface treatment material is selected from triethylene glycol di-2-ethylhexoate, tetraethylene glycol di-2-ethylhexoate, polyethylene glycol di-2-ethylhexoate and mixtures thereof.

36. A surface treated titanium dioxide pigment, comprising:
  a. a base titanium dioxide pigment; and
  b. an organic surface treatment material deposited on the surface of said base titanium dioxide pigment, said surface treatment material being selected from ethylene glycol esters, ethylene glycol diesters and mixtures thereof;
  wherein said base titanium dioxide pigment is a rutile titanium dioxide pigment produced by the chloride process;
  further comprising an additional organic treatment material deposited on the surface of said base titanium dioxide pigment;
  wherein said additional organic surface treatment material is trimethyloipropane; and
  wherein said ethylene glycol esters and ethylene glycol diesters have the general formula $ROC(OCH_2CH_2)_nOCOR$, where n is a real number from two to about fourteen and R is a straight-chain or branched-chain alkyl group containing at least two up to about fifteen carbon atoms;
  wherein said organic surface treatment material is deposited on the surface of said base inorganic pigment in an amount in the range of from about 0.01 to about 1 weight percent, based on the pigment; and
  wherein said organic surface treatment material is selected from triethylene glycol di-2-ethylhexoate, tetraethylene glycol di-2-ethylhexoate, polyethylene glycol di-2-ethylhexoate and mixtures thereof.

37. An inorganic oxide pigment having deposited on its surface at least one ethylene glycol ester, or diester, the diester having the formula $ROC(OCH_2CH_2)_nOCOR$, where n is a real number from two to fourteen and R is a straight-chain or branched-chain alkyl group containing at least two up to fifteen carbon atoms.

* * * * *

UNITED STATES PATENT AND TRADEMARK OFFICE
CERTIFICATE OF CORRECTION

| | | |
|---|---|---|
| PATENT NO. | : 7,935,753 B2 | Page 1 of 1 |
| APPLICATION NO. | : 11/598309 | |
| DATED | : May 3, 2011 | |
| INVENTOR(S) | : Thomas W. Rachal | |

It is certified that error appears in the above-identified patent and that said Letters Patent is hereby corrected as shown below:

On the Title Page, Item (74), delete "McAfee & Taft" as the Attorney, Agent, or Firm.

In the Specification

Column 2, line 27, delete "an" and insert --a-- therefor.

Column 3, line 46, delete "TiO2" and insert --titanium dioxide-- therefor.

Column 4, line 3, delete "TiO2" and insert --titanium dioxide-- therefor.

In the Claims

Column 5, Claim 5, line 50, insert --said surface treated inorganic pigment is used to form-- between "wherein" and "a" and in line 51, delete "a" and insert --said-- therefor.

Column 5, Claim 6, line 54, delete "4" and insert --5-- therefor and insert --said masterbatch composition is-- between "wherein" and "a." In line 56, delete "a" and insert --said-- therefor.

Column 5, Claim 7, line 60, insert --said surface treated inorganic pigment is used to form-- between "wherein" and "a." In line 61, delete "a" and insert --said-- therefor.

Column 5, Claim 8, line 65, delete "1" and insert --7-- therefor and insert --said masterbatch composition is-- between "wherein" and "a." In line 67, delete "a" and insert --said-- therefor.

Column 8, Claim 36, lines 40-41, delete "trimethyloipropane" and insert --trimethylolpropane-- therefor.

Signed and Sealed this
Fifth Day of August, 2014

Michelle K. Lee
*Deputy Director of the United States Patent and Trademark Office*